(12) United States Patent
Ono

(10) Patent No.: US 9,809,216 B2
(45) Date of Patent: Nov. 7, 2017

(54) VEHICLE CONTROL DEVICE AND CONTROL METHOD

(71) Applicant: NISSAN MOTOR CO., LTD., Kanagawa (JP)

(72) Inventor: Masashi Ono, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/328,716

(22) PCT Filed: Jul. 25, 2014

(86) PCT No.: PCT/JP2014/069756
§ 371 (c)(1),
(2) Date: Jan. 24, 2017

(87) PCT Pub. No.: WO2016/013124
PCT Pub. Date: Jan. 28, 2016

(65) Prior Publication Data
US 2017/0217425 A1    Aug. 3, 2017

(51) Int. Cl.
*B60W 10/04* (2006.01)
*B60W 20/13* (2016.01)
(Continued)

(52) U.S. Cl.
CPC ............ *B60W 20/13* (2016.01); *B60W 10/08* (2013.01); *B60W 10/107* (2013.01);
(Continued)

(58) Field of Classification Search
None
See application file for complete search history.

(56) References Cited

U.S. PATENT DOCUMENTS 7,530,920 B2 * 5/2009 Matsubara ............. B60K 6/445
477/3
7,988,591 B2 * 8/2011 Heap ..................... B60K 6/365
477/3
(Continued)

FOREIGN PATENT DOCUMENTS

JP    2006-170055 A    6/2006
JP    2010-007749 A    1/2010
(Continued)

OTHER PUBLICATIONS

International Preliminary Report on Patentability issued in corresponding Application No. PCT/JP2014/069756, dated Jan. 31, 2017 (9 pages).
(Continued)

*Primary Examiner* — Dirk Wright
(74) *Attorney, Agent, or Firm* — Osha Liang LLP

(57) ABSTRACT

A vehicle control device executes driving force control to set a target driving force in accordance with an engine operating state, and control an output of a driving source and a gear ratio of a continuously variable transmission so that a target driving force is realized. The device includes a power generator which can be driven by the driving source, and in a normal shifting mode, the driving force control is corrected on the basis of a power generating state of the power generator, and in a linear shifting mode giving priority to a revolution speed change of the driving source, the correction of the driving force control is not carried out.

6 Claims, 7 Drawing Sheets

(51) Int. Cl.
*B60W 20/30* (2016.01)
*B60W 10/08* (2006.01)
*B60W 10/107* (2012.01)
*F02D 29/06* (2006.01)
*F16H 61/66* (2006.01)

(52) U.S. Cl.
CPC ............. *B60W 20/30* (2013.01); *F02D 29/06* (2013.01); *B60W 2510/244* (2013.01); *B60W 2540/10* (2013.01); *B60W 2710/1005* (2013.01); *B60Y 2200/92* (2013.01); *F16H 2061/6611* (2013.01); *Y10S 903/93* (2013.01)

(56) References Cited

U.S. PATENT DOCUMENTS

| | | | | |
|---|---|---|---|---|
| 8,083,638 | B2* | 12/2011 | Imamura | B60W 20/10 477/115 |
| 8,725,336 | B2* | 5/2014 | Kobayashi | B60W 10/10 180/65.265 |
| 2008/0149407 | A1* | 6/2008 | Shibata | B60K 6/40 180/65.27 |

FOREIGN PATENT DOCUMENTS

| | | |
|---|---|---|
| JP | 2011-190872 A | 9/2011 |
| JP | 2011-214453 A | 10/2011 |

OTHER PUBLICATIONS

International Search Report issued in corresponding application No. PCT/JP2014/069756 dated Aug. 26, 2014 (5 pages).

Written Opinion of the International Searching Authority issued in corresponding application No. PCT/JP2014/069756 dated Aug. 26, 2014 (3 pages).

* cited by examiner

VEHICLE CONTROL DEVICE AND CONTROL METHOD

BACKGROUND

Technical Field

The present invention relates to a vehicle control device and a control method.

Related Art

In a control device for controlling a continuously variable transmission, in addition to a normal shifting mode, the one having a linear shifting mode which carries out shifting such as in a stepped transmission is disclosed in JP2010-7749A. In the linear shifting mode, when an engine revolution speed reaches an up-shift determination revolution speed, up-shifting is carried out.

SUMMARY OF INVENTION

In the aforementioned technology, in the up-shifting in the linear shifting mode, an engine revolution speed at an up-shift destination is set, and when the engine revolution speed reaches the up-shift determination revolution speed, an engine is controlled so that the engine revolution speed becomes the engine revolution speed of the up-shift destination.

In a vehicle having a continuously variable transmission, such a control device is known that a target driving force is set in accordance with an engine operating state of the vehicle, a target engine revolution speed and a target engine torque are set on the basis of the target driving force. In such a vehicle, the continuously variable transmission is controlled so that a target input revolution speed corresponding to the target engine revolution speed is obtained, and the engine is controlled so that the target engine torque is obtained.

In this type of vehicle, when up-shifting is to be realized in the linear shifting mode, the engine revolution speed at the up-shift destination is set once, and the target driving force for realizing the set engine revolution speed is set. Then, on the basis of this target driving force, the target engine revolution speed and the target engine torque are set, and by controlling the continuously variable transmission and the engine, shifting is carried out as in the stepped transmission in the continuously variable transmission.

The vehicle has a power generator which can be driven by the engine, and power generated by the power generator can be charged to a battery. When the power generator is driven by the engine for power generation, the target engine revolution speed is changed in accordance with a charged state of the battery.

In the vehicle on which the control device which can execute the linear shifting mode is mounted, if the target engine revolution speed is changed in accordance with the charged state of the battery, there is a concern that the engine revolution speed is shifted from the engine revolution speed of the up-shift destination in the linear shifting mode. That is, when the up-shifting is to be carried out in the linear shifting mode, there is a concern that the engine revolution speed is shifted from the engine revolution speed of the up-shift destination in accordance with the charged state of the battery, and this shift gives a sense of discomfort to a driver.

One or more embodiments of the present invention suppresses a change of the engine revolution speed in accordance with the charged state of the battery when up-shifting is to be carried out in the linear shifting mode.

One or more embodiments of the present invention provides a vehicle control device configured to execute driving force control that sets a target driving force in accordance with an engine operating state, and controls an output of a driving source and a gear ratio of a continuously variable transmission so as to realize the target driving force. The vehicle control device includes a power generator capable of being driven by the driving source. In a normal shifting mode, the driving force control is corrected on the basis of a power generating state of the power generator, and in a linear shifting mode that gives priority to a revolution speed change of the driving source, the correction of the driving force control is not carried out.

DETAILED DESCRIPTION

Embodiments of the present invention will be described below by referring to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
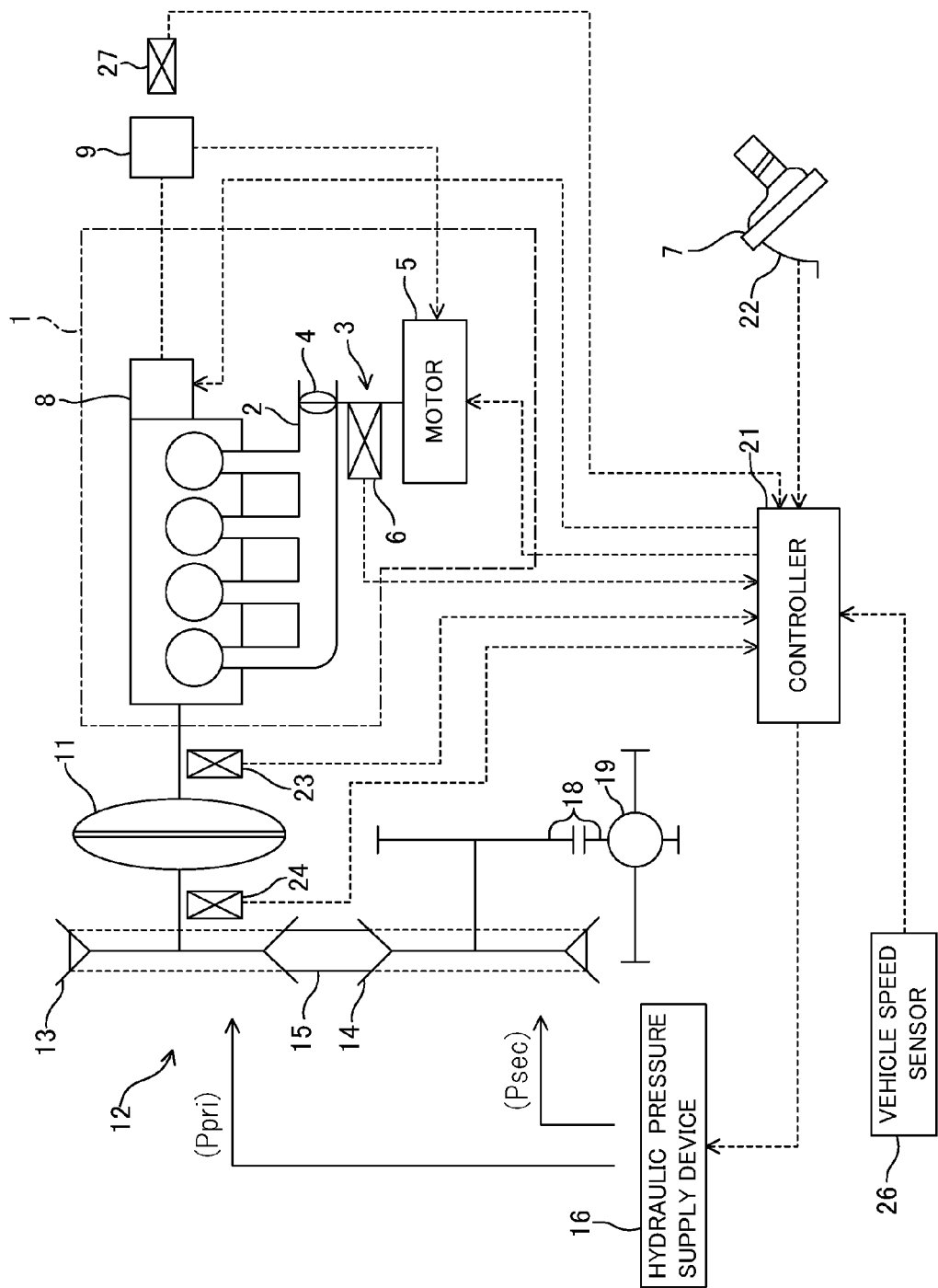
FIG. 1 is an outline constitution diagram of a vehicle according to one or more embodiments of the present invention.

By referring to FIG. 1, an output of an engine 1 of a vehicle is input into a continuously variable transmission 12 through a torque converter 11. The continuously variable transmission 12 includes a primary pulley 13 and a secondary pulley 14 and a V-belt 15 extended around them. The primary pulley 13 changes a contact radius with the V-belt 15 by changing a groove width in accordance with a hydraulic pressure Ppri. The secondary pulley 14 changes the contact radius with the V-belt 15 by changing the groove width in accordance with a hydraulic pressure Psec. As a result, the continuously variable transmission 12 continuously changes a ratio between an input revolution speed and an output revolution speed, that is, a gear ratio or a transmission ratio in accordance with control of the hydraulic pressure Ppri and the hydraulic pressure Psec. The hydraulic pressure Ppri and the hydraulic pressure Psec are generated by a hydraulic pressure supply device 16.

The secondary pulley 14 is connected to a driving wheel through a final gear 18 and a differential 19.

The engine 1 includes an intake throttle device 3 for adjusting an intake amount. The intake throttle device 3 includes an intake throttle 4 provided in an intake passage 2 of the engine 1 and an electric motor 5 which changes a position of the intake throttle 4 in accordance with an input signal.

With respect to the engine 1, the power generator 8 can be connected/disconnected by using a clutch or the like. When a charged state (hereinafter referred to as an SOC (State Of Charge) of a battery 9 is lowered, the clutch is engaged, the power generator 8 is driven by the engine 1, and the power generator 8 generates power. The SOC is a charged amount of the battery 9 or a charged rate of the battery 9. Power generated by the power generator 8 charges the battery 9. The battery 9 supplies the power to the electric motor 5 and the like.

The hydraulic pressure supply device 16 and the intake throttle device 3 are operated in accordance with an instruction signal output by a controller 21.

The controller 21 is constituted by a microcomputer including a central processing unit (CPU), a read-only memory (ROM), a random-access memory (RAM), and an input/output interface (I/O interface). The controller 21 may be constituted by a plurality of microcomputers.

To the controller 21, detection signals from a throttle position sensor 6 for detecting a throttle position of the intake throttle 4, an accelerator position sensor 22 for detecting an accelerator position of an accelerator pedal 7 provided in the vehicle, an engine revolution speed sensor 23 for detecting a revolution speed of the engine 1, a primary-pulley revolution speed sensor 24 for detecting a primary-pulley revolution speed, a vehicle speed sensor 26 for detecting a running speed of the vehicle, and a current sensor 27 for detecting an SOC of the battery 9 are input.

The controller 21 controls a driving force of the vehicle by executing position control of the intake throttle 4 and shifting control of the continuously variable transmission 12 through the hydraulic pressure supply device 16 in accordance with these detection signals.

The controller 21 controls the engine 1 and the continuously variable transmission 12 by switching between a normal shifting mode and a linear shifting mode in accordance with an acceleration request by the driver. The normal shifting mode is a control mode executed at the time when there is no acceleration request by the driver or when the acceleration request is small. The linear shifting mode is a control mode executed at the time when the acceleration request by the driver is large and is a control mode giving priority to a change of the revolution speed of the engine 1. In the linear shifting mode, a gear ratio of the continuously variable transmission 12 is changed in steps so that a vehicle speed is increased while a gradual increase and a rapid decrease of the engine revolution speed are repeatedly carried out, and pseudo stepped shifting is carried out in the continuously variable transmission 12.

Figure 2:
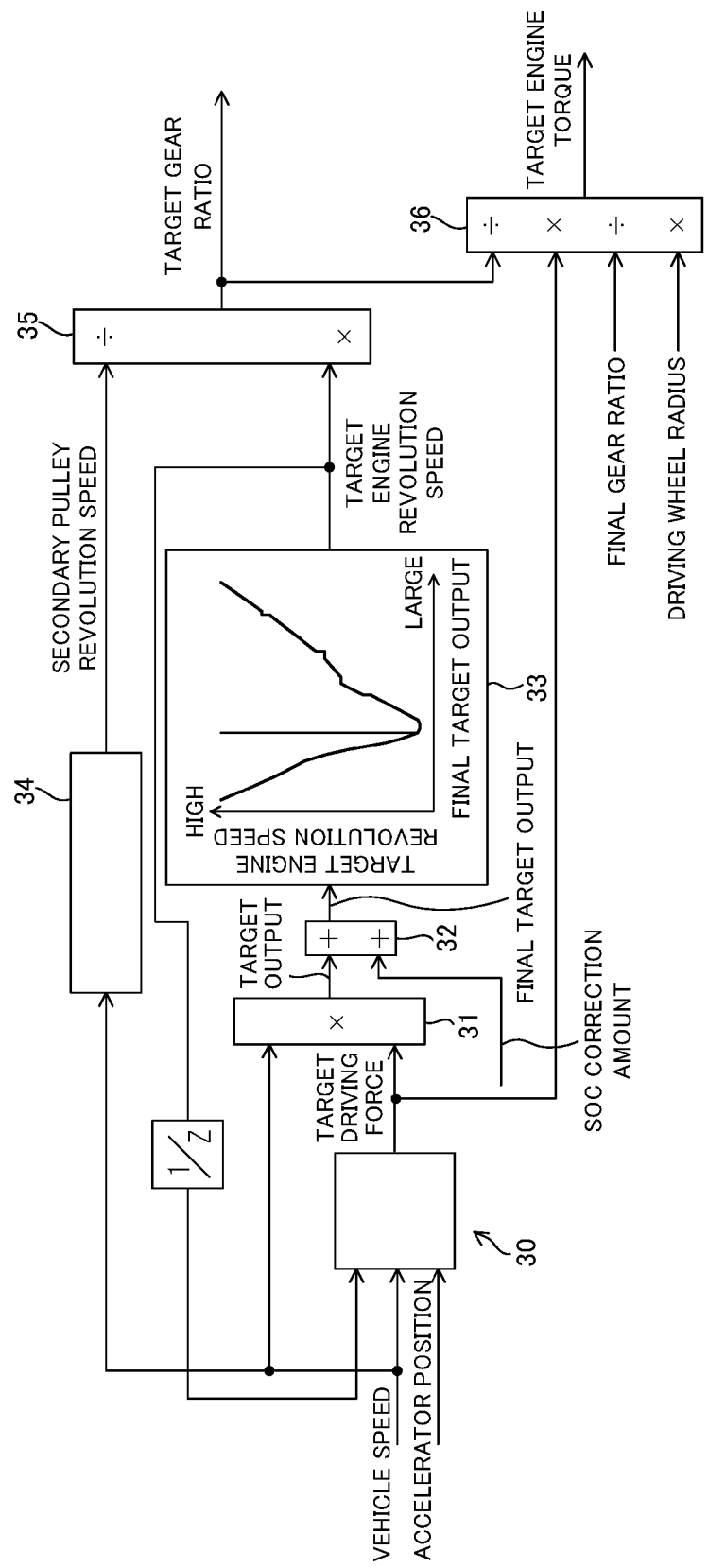
FIG. 2 is a control block diagram for explaining a method of setting a target gear ratio and a target engine torque according to one or more embodiments of the present invention.

Subsequently, a target gear ratio according to one or more embodiments of the present invention and a setting method of a target engine torque will be described by using the control block diagram in FIG. 2. The control described below is executed by the controller 21.

A target driving force setting portion 30 sets a target driving force on the basis of a vehicle speed, an accelerator position, and a target engine revolution speed, though details will be described later.

A target output setting portion 31 sets a target output on the basis of the target driving force and a current vehicle speed detected by the vehicle speed sensor 26.

Figure 3:
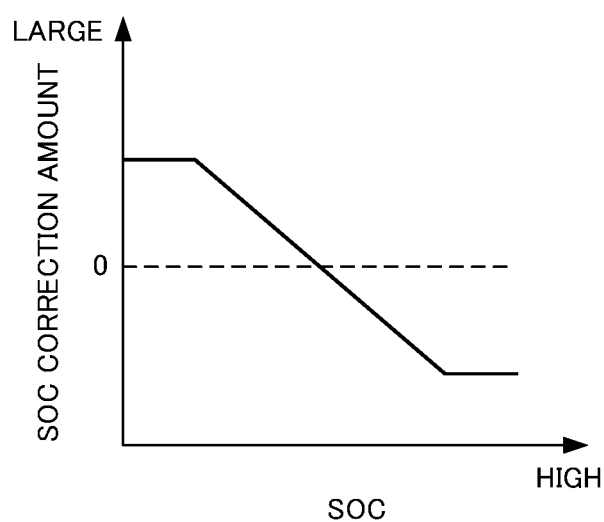
FIG. 3 is a map illustrating a relationship between an SOC and an SOC correction amount.

A first correction portion 32 corrects the target output by an SOC correction amount and sets a final target output. Specifically, the first correction portion 32 adds the SOC correction amount to the target output. The SOC correction amount is calculated on the basis of a power generating state of the power generator 8 and specifically, it is calculated from a map illustrated in FIG. 3 on the basis of the SOC calculated on the basis of a signal from the current sensor 27. FIG. 3 is a map illustrating a relationship between the SOC and the SOC correction amount, and if the SOC lowers, the SOC correction amount becomes larger. In the first correction portion 32, since the target output is corrected by the SOC correction amount, the target engine revolution speed which will be described later is also corrected.

Figure 4:
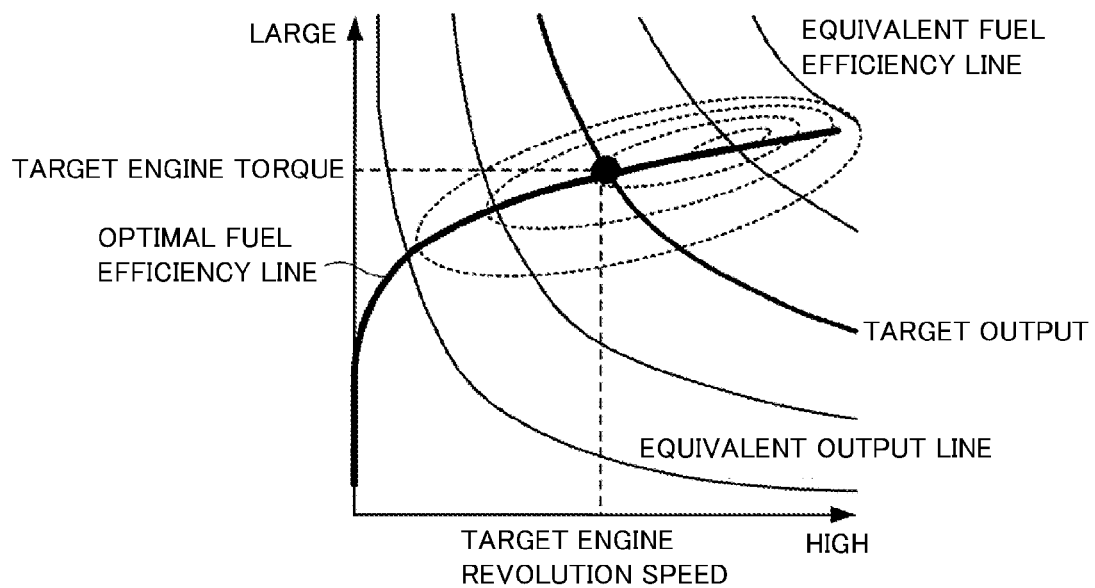
FIG. 4 is a map illustrating an optimal fuel efficiency line.

A target engine revolution speed setting portion 33 sets the target engine revolution speed from the map on the basis of the target output. The map used here is prepared on the basis of a map illustrating an optimal fuel efficiency line in FIG. 4, and the target engine revolution speed with good fuel efficiency of the engine 1 is set on the basis of the target output.

A target output revolution speed calculation portion 34 calculates a secondary pulley revolution speed on the basis of the vehicle speed detected by the vehicle speed sensor 26.

A target gear ratio setting portion 35 sets a target gear ratio by dividing the target engine revolution speed by the secondary pulley revolution speed.

A target engine torque setting portion 36 sets a target engine torque by multiplying the target driving force and a radius of the driving wheel and by dividing the multiplied value by the target gear ratio and a final gear ratio.

On the basis of the target gear ratio and the target engine torque set as above, the gear ratio of the continuously variable transmission 12 and the output of the engine 1 are controlled.

Figure 5:
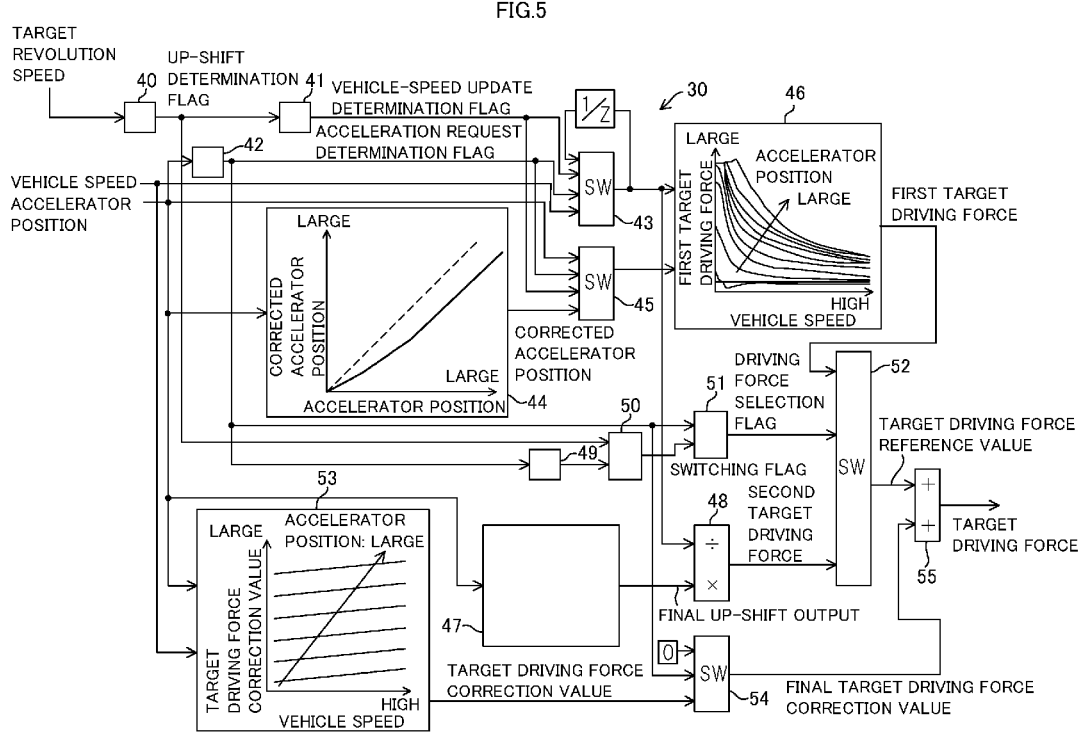
FIG. 5 is a control block diagram illustrating a target driving force setting portion.

Subsequently, the target driving force setting portion 30 will be described in detail by using FIG. 5. FIG. 5 is a control block diagram of the target driving force setting portion 30.

An up-shift determination portion 40 outputs an up-shift determination flag on the basis of the target engine revolution speed and an up-shift determination value set in advance. The up-shift determination portion 40 outputs "1" as the up-shift determination flag when the target engine revolution speed becomes the up-shift determination value and outputs "0" as the up-shift determination flag in the other cases. The up-shift determination value is set in advance and is set so that up-shifting is carried out in a region with good fuel efficiency along the optimal fuel efficiency line illustrated in FIG. 4, and the vehicle is made to run. For example, by setting the up-shift determination value so that a region with particularly good fuel efficiency is selected in the optimal fuel efficiency line and the vehicle is made to run using the selected region, the engine 1 can be used in the region with good fuel efficiency. The up-shift determination flag becomes "1" each time the target engine revolution speed becomes the up-shift determination value and then becomes "0" again. The up-shift determination value is set on the basis of the accelerator position. As a result, timing when the up-shifting is carried out can be set in accordance with the accelerator position.

A vehicle-speed update determination portion 41 reverses the up-shift determination flag output by the up-shift determination portion 40 and outputs a vehicle-speed update determination flag. The vehicle-speed update determination flag is "1" when the up-shift determination flag is "0" and it is "0" when the up-shift determination flag is "1".

An acceleration request determination portion 42 determines an acceleration request by the driver on the basis of the accelerator position detected by the accelerator position sensor 22. Specifically, the acceleration request determination portion 42 determines that the acceleration request is made when an increase amount of the accelerator position per unit time is a first predetermined increase amount or more and outputs "1" as the acceleration request determination flag. The acceleration request determination portion 42 determines that the acceleration request is not made when the increase amount of the accelerator position per unit time is smaller than the first predetermined increase amount and outputs "0" as the acceleration request determination flag. The acceleration request determination portion 42 changes the acceleration request flag to "0" when the increase amount of the accelerator position per unit time becomes smaller than a second predetermined increase amount after it sets "1" to the acceleration request flag. The second predetermined increase amount is a value smaller than the first predetermined increase amount and is a negative value, for example.

If the acceleration request determination flag is "0", the normal shifting mode, not the linear shifting mode, is selected, while if the acceleration request determination flag is "1", the linear shifting mode is selected.

A vehicle speed selection portion 43 selects a vehicle speed on the basis of the acceleration request determination flag and the vehicle-speed update determination flag. When the acceleration request determination flag is changed from "0" to "1", the vehicle speed selection portion 43 selects the vehicle speed detected by the vehicle speed sensor 26 when the acceleration request determination flag is changed. After that, if the acceleration request determination flag is "1" and the vehicle-speed update determination flag is "1", the vehicle speed selection portion 43 holds the vehicle speed when the acceleration request determination flag is changed.

When the acceleration request determination flag is "1" and the vehicle-speed update determination flag is changed from "1" to "0", the vehicle speed selection portion 43 updates the held vehicle speed to a vehicle speed detected by the vehicle speed sensor 26 when the vehicle-speed update determination flag was changed. After that, if the acceleration request determination flag is "1" and the vehicle-speed update determination flag is "1", the vehicle speed selection portion 43 holds the updated vehicle speed. As described above, the vehicle speed selection portion 43 updates the vehicle speed each time the vehicle-speed update determination flag is changed from "1" to "0" if the acceleration request determination flag is "1" and holds the updated vehicle speed after that.

If the acceleration request determination flag is "0", the vehicle speed selection portion 43 selects the current vehicle speed detected by the vehicle speed sensor 26.

An accelerator position correction portion 44 corrects the accelerator position detected by the accelerator position sensor 22 on the basis of the map. The corrected accelerator position becomes smaller than the accelerator position before the correction.

An accelerator position selection portion 45 selects an accelerator position on the basis of the acceleration request determination flag. The accelerator position selection portion 45 selects the corrected accelerator position until the vehicle-speed update determination flag is changed from "1" to "0" for the first time since the acceleration request determination flag is changed from "0" to "1" and in the other cases, it selects the accelerator position which is detected by the accelerator position sensor 22 and is not corrected.

A first target driving force setting portion 46 sets a first target driving force from the map on the basis of the vehicle speed selected by the vehicle speed selection portion 43 and the accelerator position selected by the accelerator position selection portion 45.

Until the vehicle-speed update determination flag is changed from "1" to "0" for the first time since the acceleration request determination flag was changed from "0" to "1", the accelerator position selected by the accelerator position selection portion 45 is the corrected accelerator position. Thus, the first target driving force becomes smaller than the first target driving force set on the basis of the accelerator position not corrected. When the target engine revolution speed calculated on the basis of the target output obtained by multiplying the first target driving force and the vehicle speed becomes the up-shift determination value, the up-shift determination flag is changed from "0" to "1", and the first up-shifting is carried out since the acceleration request was made. Until this first up-shifting is carried out, by setting the first target driving force by using the corrected accelerator position, the target engine revolution speed becomes lower than the case using the accelerator position not corrected, and timing when the first up-shifting is carried out can be delayed, and a sense of acceleration can be performed until the first up-shifting.

Figure 6:
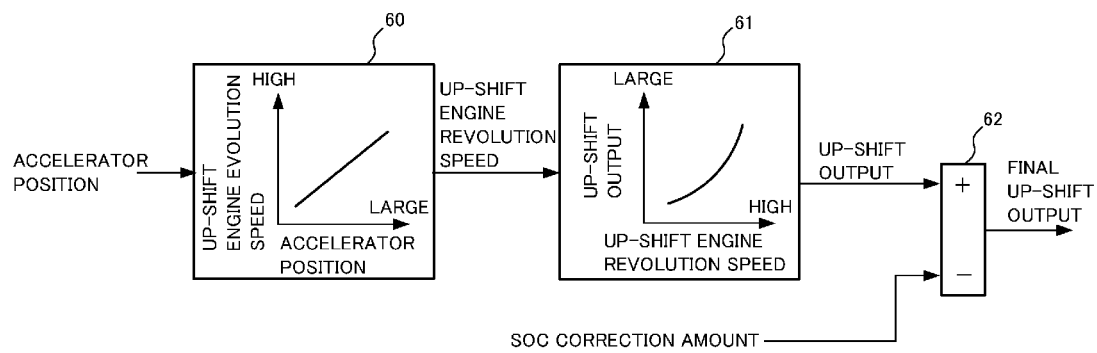
FIG. 6 is a control block diagram illustrating an up-shift output portion.

A final up-shift output setting portion 47 will be described in detail by using FIG. 6. FIG. 6 is a control block diagram of the final up-shift output setting portion 47.

An up-shift engine revolution speed setting portion 60 sets an up-shift engine revolution speed which is an engine revolution speed of an up-shift destination in the linear shifting mode from the map on the basis of the accelerator position detected by the accelerator position sensor 22. When the accelerator position becomes large, the up-shift engine revolution speed becomes high.

An up-shift output setting portion 61 sets an up-shift output from the map on the basis of the up-shift engine revolution speed. The up-shift output is set so that up-shifting is carried out in a region with good fuel efficiency along the optimal fuel efficiency line in FIG. 4 and the vehicle is made to run. For example, by selecting the region with particularly good fuel efficiency in the optimal fuel efficiency line, and by setting up-shift output so that the vehicle is made to run by using the selected region, the engine 1 can be used in the region with the good fuel efficiency. When the up-shift engine revolution speed becomes high, the up-shift output becomes larger.

A second correction portion 62 corrects the up-shift output by the SOC correction amount and sets the final up-shift output. Specifically, the second correction portion 62 subtracts the SOC correction amount from the up-shift output. The SOC correction amount is the same as the SOC correction amount for correcting the target output by the first correction portion 32. That is, the second correction portion 62 corrects the up-shift output so as to cancel the correction by the first correction portion 32. As a result, even if correction is made by the first correction portion 32, correction based on the SOC is not substantially made.

Returning to FIG. 5, a second target driving force setting portion 48 sets a second target driving force by dividing the final up-shift output by the vehicle speed selected by the vehicle speed selection portion 43. If the acceleration request determination flag is "1" and the vehicle-speed update determination flag is "1", since the vehicle speed is held, the second target driving force is set on the basis of the held vehicle speed and the final up-shift output. Since the vehicle speed is updated when the acceleration request determination flag is "1" and the vehicle-speed update determination flag is changed from "1" to "0", the second target driving force is set on the basis of the updated vehicle speed and the final up-shift output and is decreased in steps before and after the update of the vehicle speed.

An acceleration request reversing portion 49 reverses and outputs the acceleration request determination flag. If the acceleration request determination flag output from the acceleration request determination portion 42 is "0", the acceleration request reversing portion 49 changes the acceleration request determination flag to "1" and if the acceleration request flag output from the acceleration request determination portion 42 is "1", it changes the acceleration request determination flag to "0".

A first target driving force switching flag output portion 50 outputs a switching flag on the basis of the up-shift determination flag and an acceleration request determination flag reversed by the acceleration request reversing portion 49. If the acceleration request determination flag is "0" ("1" after the reversal), the first target driving force switching flag output portion 50 outputs "0" as the switching flag. Even if the acceleration request determination flag is changed from "0" ("1" after the reversal) to "1" ("0" after the reversal), the first target driving force switching flag output portion 50 outputs "0" as the switching flag until the up-shift determination flag is changed from "0" to "1" for the first time since the acceleration request determination flag was changed to "1" ("0" after the reversal). If the up-shift determination flag is changed from "0" to "1" when the acceleration request determination flag is "1" ("0" after the reversal), the first target driving force switching flag output portion 50 outputs "1" as the switching flag at each change. The first target driving force switching flag output portion 50 changes the switching flag from "1" to "0" when the acceleration request determination flag is changed from "1" ("0" after the reversal) to "0" ("1" after the reversal).

A second target driving force switching flag output portion 51 outputs a driving force selection flag on the basis of the acceleration request determination flag and the switching flag. If the acceleration request determination flag is "0", the second target driving force switching flag output portion 51 outputs "1" as the a driving force selection flag. If the acceleration request determination flag is "1", the second target driving force switching flag output portion 51 outputs "0" as the driving force selection flag when the switching flag is changed from "0" to "1", while in the other cases, it outputs "1" as the driving force selection flag.

A target driving force selection portion 52 selects a target driving force reference value on the basis of the driving force selection flag. If the driving force selection flag is "1", the target driving force selection portion 52 selects the first target driving force set by the first target driving force setting portion 46 as the target driving force reference value. If the driving force selection flag is "0", the target driving force selection portion 52 selects the second target driving force set by the second target driving force setting portion 48 as the target driving force reference value.

If the acceleration request determination flag is "1", the target driving force selection portion 52 sets the second target driving force as the driving force reference value when the up-shift determination flag is changed to "1". Even if the acceleration request determination flag is "1", the target driving force selection portion 52 sets the first target driving force as the target driving force reference value other than the case where the up-shift determination flag is changed to "1".

A target driving force correction value setting portion 53 sets a target driving force correction value from the map on the basis of the vehicle speed detected by the vehicle speed sensor 26 and the accelerator position. The target driving force correction value becomes larger when the vehicle speed becomes higher, while it becomes larger when the accelerator position becomes larger. The target driving force correction value is set so as to become larger if running resistance of the vehicle becomes larger. Thus, even in an engine operating state where the running resistance becomes larger, sufficient acceleration can be obtained by correcting the target driving force reference value by the correction value.

A target driving force correction selection portion 54 selects a final target driving force correction value on the basis of the acceleration request determination flag. The target driving force correction selection portion 54 selects zero as the final target driving force correction value when the acceleration request determination flag is "0". The target driving force correction selection portion 54 selects the target driving force correction value as the final target driving force correction value when the acceleration request determination flag is "1".

A final target driving force setting portion 55 sets a target driving force by adding up the target driving force reference value and the final target driving force correction value. If the acceleration request determination flag is "0", the final target driving force correction value is zero, and the target driving force reference value becomes the target driving force.

As described above, the target driving force setting portion 30 sets the target driving force.

In one or more embodiments of the present invention, if the acceleration request determination flag is "0", the normal shifting mode is selected, the current vehicle speed is selected by the vehicle speed selection portion 43, and the first target driving force based on the current vehicle speed is selected as the reference target driving force. Then, the final target output corrected on the basis of the SOC by the first correction portion 32 is set, the target gear ratio and the target engine torque are set on the basis of the final target output, and the continuously variable transmission 12 and the engine 1 are controlled. Thus, even if the power generator 8 is driven by the engine 1, the vehicle can be made to run by the driving force according to the target driving force.

On the other hand, if the acceleration request determination flag is "1", the linear shifting mode is selected, the vehicle speed held by the vehicle speed selection portion 43 is selected until the up-shift determination flag becomes "1" (the vehicle-speed update determination flag is "0"), and the first target driving force based on the held vehicle speed is selected as the target driving force reference value. Then, when the up-shift determination flag becomes "1", the vehicle speed held by the vehicle speed selection portion 43 is updated, and the second target driving force based on the updated vehicle speed is selected as the target driving force reference value. The second target driving force is set by making correction by the second correction portion 62 for cancelling the correction by the first correction portion 32. Thus, after that, even if the correction based on the SOC is made by the first correction portion 32, the correction based on the SOC is not executed in the end. Therefore, at the up-shifting in the linear shifting mode, the final target output is set regardless of the SOC, the target gear ratio and the target engine torque are set on the basis of the final target output, and the engine 1 and the continuously variable transmission 12 are controlled. As a result, pseudo stepped shifting is executed in the linear shifting mode, and the engine revolution speed at the up-shifting matches the up-shift engine revolution speed.

Figure 7:
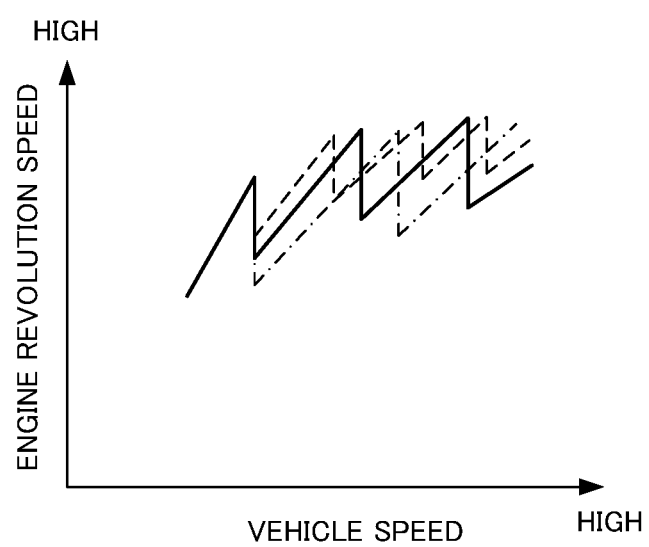
FIG. 7 is a diagram illustrating a change in an engine revolution speed in a linear shifting mode.

If the correction by the second correction portion 62 for cancelling the correction by the first correction portion 32 is not made at the up-shifting in the linear shifting mode, as illustrated in FIG. 7, the correction by the first correction portion 32 is made and thus, the engine revolution speed might shift from the up-shift engine revolution speed in some cases. In FIG. 7, a case where the correction by the first correction portion 32 is cancelled by the second correction portion 62 is indicated by a solid line, and a case where the correction by the first correction portion 32 is not cancelled by the second correction portion 62 is indicated by a broken line and a one-dot chain line. In FIG. 7, a case where the SOC correction amount in the first correction portion 32 is positive is indicated by the broken line and a case where the SOC correction amount is negative is indicated by the one-dot chain line. If the correction by the first correction portion 32 is not cancelled by the second correction portion 62, the engine revolution speed at the up-shifting in the linear shifting mode is changed in accordance with the SOC correction amount. In one or more embodiments of the present invention, by cancelling the correction by the first correction portion 32 by the second correction portion 62, the engine revolution speed at the up-shifting in the linear shifting mode becomes constant regardless of the SOC.

Below, examples of advantages of one or more embodiments of the present invention will be described. The advantages are merely examples, and do not limit the scope of the claims.

In the linear shifting mode, rhythmic acceleration is realized by repetitious execution of an increase of the engine revolution speed and the up-shifting. Thus, if a change shifting from a change of the predetermined engine revolution speed occurs at the up-shifting, sufficient acceleration or rhythmic feeling is collapsed, and a sense of discomfort is given to the driver.

In one or more embodiments of the present invention, in the case of the normal shifting mode, the engine revolution speed is corrected on the basis of the SOC, and in the case of the linear shifting mode, the target engine revolution speed is not corrected on the basis of the SOC. As a result, the engine revolution speed at the up-shifting in the linear shifting mode is not changed by the SOC, and the change of the engine revolution speed at the up-shifting in the linear shifting mode becomes constant. Therefore, the sense of discomfort given to the driver can be suppressed.

The linear shifting mode and the normal shifting mode can be switched in accordance with the acceleration request by the driver. In the normal shifting mode where there is no or small acceleration request by the driver, the driving force generated in the vehicle is the target driving force regardless of the SOC. In the linear shifting mode where the acceleration request by the driver is large, rhythmic acceleration can be realized.

At the up-shifting in the linear shifting mode, the up-shift engine revolution speed is set, and the up-shift output is set on the basis of the up-shift engine revolution speed. Moreover, the correction for cancelling the correction based on the SOC is made to the up-shift output. As a result, even if the correction based on the SOC is made after that, the target engine revolution speed does not shift from the up-shift engine revolution speed. Thus, the sense of discomfort given to the driver at the up-shifting in the linear shifting mode can be suppressed.

In the linear shifting mode, when the target driving force is to be lowered in steps, the target driving force is set on the basis of the up-shift output subjected to the correction for cancelling the correction based on the SOC. As a result, at the up-shifting particularly when the sense of discomfort can be given to the driver easily, the sense of discomfort given to the driver can be suppressed.

Embodiments of the present invention are described above, but the aforementioned embodiments are merely examples, and do not limit the scope of the claims.

The aforementioned continuously variable transmission 12 may be mounted on a hybrid vehicle or a motor may function as a driving source.

In one or more embodiments of the present invention, correction is made to the target output in the first correction portion 32 and the correction for cancelling the correction in the first correction portion 32 is made to the up-shift output in the second correction portion 62, but this is not limiting. It is only necessary to configure such that the target engine revolution speed is corrected on the basis of the SOC in the normal shifting mode and the target engine revolution speed based on the SOC is not corrected in the linear shifting mode.

Moreover, in the first target driving force switching flag output portion 50, it may be so configured that, after "1" is output as the switching flag, the switching flag is set to "1" until the acceleration request determination flag is switched from "1"("0" after the reversal) to "0" ("1" after the reversal), and the switching flag is changed from "1" to "0" when the acceleration request determination flag is switched from "1" ("0" after the reversal) to "0" ("1" after the reversal). Moreover, it may be so configured that a selection portion for selecting whether or not the correction by the first correction portion 32 is to be made on the basis of the acceleration request determination flag is provided, and the correction by the first correction portion 32 is made if the acceleration request determination flag is "0" and the correction by the first correction portion 32 is not made if the acceleration request determination flag is "1". By means of them, the correction based on the SOC can be also configured not to be made in the linear shifting mode.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control device configured to execute driving force control that sets a target driving force in accordance with an engine operating state, and controls an output of a driving source and a gear ratio of a continuously variable transmission so as to realize the target driving force, the vehicle control device comprising:
    a power generator configured to be driven by the driving source,
    wherein, in a normal shifting mode, the driving force control is corrected on the basis of a power generating state of the power generator, and
    wherein, in a linear shifting mode that gives priority to a revolution speed change of the driving source, the correction of the driving force control is not performed.

2. The vehicle control device according to claim 1, wherein the vehicle control device is configured to switch whether the linear shifting mode is executed or not on the basis of an acceleration request by a driver.

3. The vehicle control device according to claim 1,
wherein, in the linear shifting mode, a correction that cancels the correction of the driving force control based on the power generating state is made.

4. The vehicle control device according to claim 3,
wherein, in the linear shifting mode, an up-shift revolution speed is set on the basis of an accelerator position, an up-shift output is set on the basis of the up-shift revolution speed, and the correction for cancelling the correction of the driving force control based on the power generating state is made to the up-shift output.

5. The vehicle control device according to claim 3,
wherein the target driving force is set to reduce stepwise on the basis of the corrected up-shift output when the continuously variable transmission is up-shifted in the linear shifting mode.

6. A vehicle control method comprising:
executing driving force control that sets a target driving force in accordance with an engine operating state, and
executing driving force control that controls an output of a driving source and a gear ratio of a continuously variable transmission so as to realize the target driving force,
wherein, in a normal shifting mode, the driving force control is corrected on the basis of a power generating state of a power generator capable of being driven by the driving source; and
wherein, in a linear shifting mode that gives priority to a revolution speed change of the driving source, the correction of the driving force control is not performed.

* * * * *